United States Patent
Malkes et al.

(10) Patent No.: US 10,775,473 B2
(45) Date of Patent: Sep. 15, 2020

(54) CORRECTING LOCATION DATA OF CONNECTED VEHICLE

(71) Applicant: Cubic Corporation, San Diego, CA (US)

(72) Inventors: William A. Malkes, Knoxville, TN (US); William S. Overstreet, Knoxville, TN (US); Jeffrey R. Price, Knoxville, TN (US); Michael J. Tourville, Lenior City, TN (US)

(73) Assignee: Cubic Corporation, San Diego, CA (US)

( * ) Notice: Subject to any disclaimer, the term of this patent is extended or adjusted under 35 U.S.C. 154(b) by 28 days.

(21) Appl. No.: 16/395,807

(22) Filed: Apr. 26, 2019

(65) Prior Publication Data

US 2019/0331758 A1    Oct. 31, 2019

Related U.S. Application Data

(60) Provisional application No. 62/664,010, filed on Apr. 27, 2018.

(51) Int. Cl.
| | |
|---|---|
| *G01S 5/00* | (2006.01) |
| *G01S 5/02* | (2010.01) |
| *G01S 7/40* | (2006.01) |
| *G01S 19/49* | (2010.01) |

(52) U.S. Cl.
CPC .......... *G01S 5/021* (2013.01); *G01S 7/4004* (2013.01); *G01S 19/49* (2013.01)

(58) Field of Classification Search
CPC ......... G01S 5/021; G01S 7/4004; G01S 19/49
See application file for complete search history.

(56) References Cited

U.S. PATENT DOCUMENTS

| | | | |
|---|---|---|---|
| 5,225,842 A | 7/1993 | Brown et al. | |
| 5,926,113 A | 7/1999 | Jones et al. | |
| 6,246,954 B1 | 6/2001 | Berstis et al. | |
| 6,560,535 B2 | 5/2003 | Levy et al. | |
| 8,744,740 B2 | 6/2014 | Oh et al. | |
| 2009/0005985 A1 | 1/2009 | Basnayake | |
| 2012/0173140 A1 | 7/2012 | Czompo | |
| 2013/0297195 A1* | 11/2013 | Das | G08G 1/163 701/117 |
| 2013/0307723 A1* | 11/2013 | Garin | H04W 64/003 342/357.29 |
| 2016/0187147 A1* | 6/2016 | Kang | G01C 21/26 701/468 |

(Continued)

OTHER PUBLICATIONS

International Search Report and Written Opinion dated Jul. 8, 2019 in related foreign application PCT/US2019/029706, 17 pgs.

*Primary Examiner* — Khai M Nguyen
(74) *Attorney, Agent, or Firm* — Kilpatrick Townsend & Stockton, LLP

(57) ABSTRACT

A vehicle and a traffic infrastructure device both determine their respective locations, at least one of which uses a positioning device to determine its location. At least one sends its respective location to the other, which compares the two locations, identifies a location difference, generates calibration information based on the location difference, and either calibrates the positioning device based on the calibration information or transmits the calibration information to the other device for the other device to calibrate the positioning device.

20 Claims, 13 Drawing Sheets

(56) References Cited

U.S. PATENT DOCUMENTS

2017/0019763 A1* 1/2017 Chi .................. G01S 19/25
2017/0099648 A1* 4/2017 Malik ................ H04W 64/00
2018/0302771 A1* 10/2018 Griesbeck ........... H04W 4/44
2019/0243367 A1* 8/2019 Huang .............. G06K 9/00825

* cited by examiner

CORRECTING LOCATION DATA OF CONNECTED VEHICLE

CROSS-REFERENCE TO RELATED APPLICATIONS

The present disclosure claims the priority benefit of U.S. provisional application 62/664,010 filed Apr. 27, 2018 and titled "Method and System for Correcting Location Data of Connected Vehicles," the disclosure of which is incorporated herein by reference.

BACKGROUND OF THE INVENTION

1. Field of the Disclosure

The present disclosure is generally related to vehicular navigation systems, and more particularly related to method and system for determining accuracy of connected vehicles sensor data.

2. Description of the Related Art

Developments in the Information and Communication Technology (ICT) domain has led to rise in connected cars. Connected cars or vehicles can establish Vehicle to Vehicle (V2V) communication. Such connected vehicles also communicate with other non-vehicle infrastructure devices via vehicle-to infrastructure (V2I) or infrastructure-to-vehicle (I2V) communications. These vehicles are also connected through a communication network. Such connected vehicles may continuously determine their respective locations using positioning receivers or other sensors. In general, the sensor data available at the connected vehicles is approximate and is subject to deviations due to continuous movement of the vehicle.

There exist many tracking mechanisms for determining location of the connected vehicles. Some methods utilize satellite based techniques or by receiving location information from near-by other connected vehicles. These methods may provide calibration of the location data, however this data is still subject to deviations due to movement, environmental issues, or malicious intent.

Thus, there is a need to provide a method and system that supports exact location data to connected vehicles and provide efficient calibration of the available sensor data.

DETAILED DESCRIPTION

A vehicle and a traffic infrastructure device both determine their respective locations, at least one of which uses a positioning device to determine its location. At least one sends its respective location to the other, which compares the two locations, identifies a location difference, generates calibration information based on the location difference, and either calibrates the positioning device based on the calibration information or transmits the calibration information to the other device for the other device to calibrate the positioning device.

Figure 1:
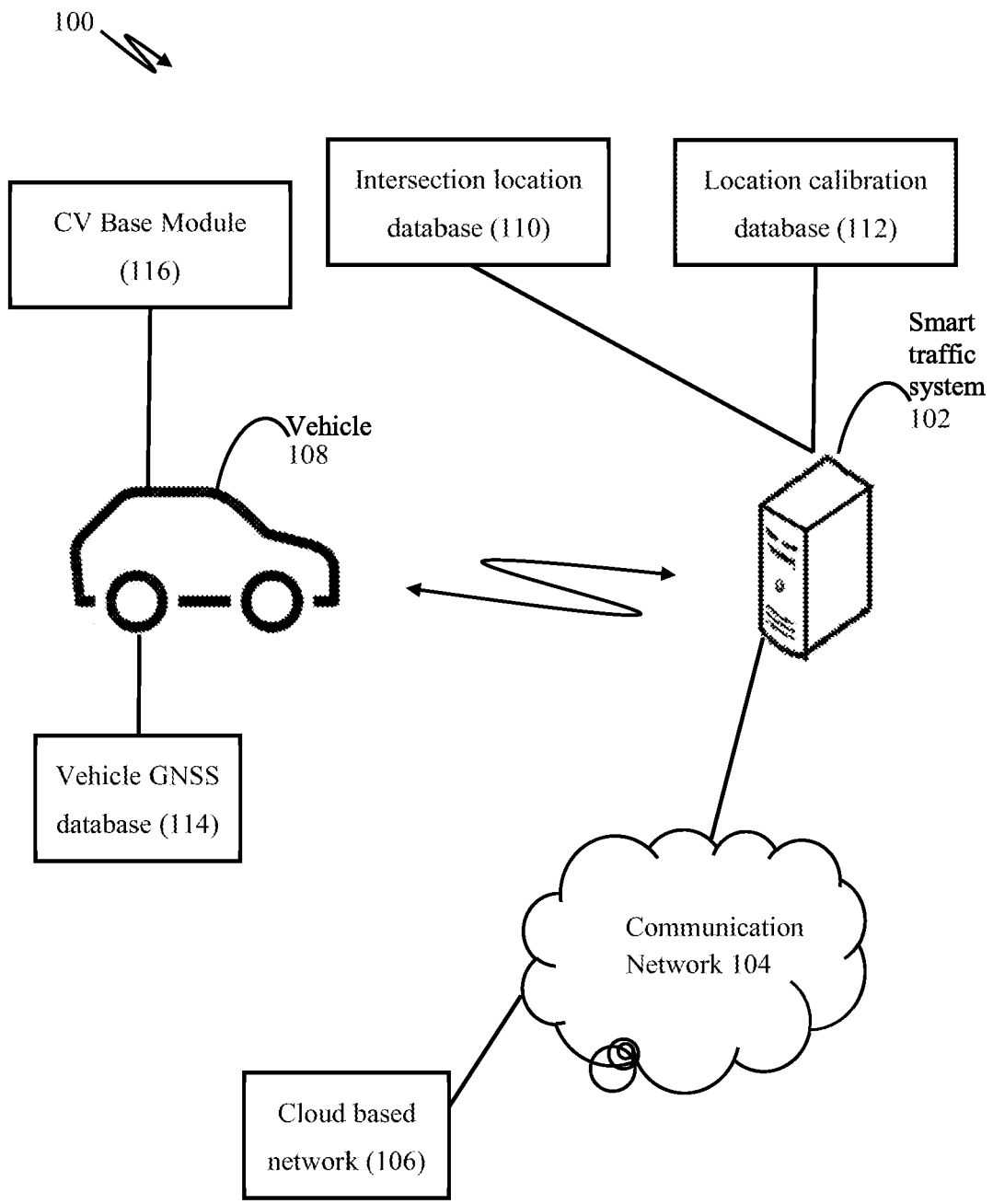
FIG. 1 illustrates a network connection diagram of a system for correcting location data of connected vehicles.

FIG. 1 illustrates a network connection diagram of a system for correcting location data of connected vehicles. The network connection diagram 100 of the smart traffic system 102 of FIG. 1 includes a traffic cabinet and other components for correcting location data of connected vehicles. The smart traffic system 102 is connected with a communication network 104. Communication network 104 can connect any of the various devices disclosed herein. The communication network 104 may be a wired and/or a wireless network. The communication network 104, if wireless, may be implemented using communication techniques such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, and other communication techniques known in the art.

The smart traffic system 102 includes a traffic cabinet with computing and communication capabilities. The smart traffic system 102 may perform various processing functions and establish communication with other communicating devices around, for example using any of the network connection types discussed with respect to the output devices 1150 and input devices 1160 of FIG. 11. The smart traffic system 102 may be installed on a side of a road, above a road, under a road, in or above a road intersection, along a bridge, along a railway, or a combination thereof, The smart traffic system 102 may control and/or guide traffic on the road or roads that it is located on, alongside, or near, for example by incorporating and/or controlling signage and/or traffic signal indicators for vehicles, pedestrians, bicyclists, aircraft, watercraft, or combinations thereof, for example. The smart traffic system 102 may also be referred to as a traffic infrastructure device, or a smart infrastructure device, or a smart traffic device, or a traffic device, or a infrastructure device, or any combination of those terms.

The smart traffic system 102 may also include a number of sensors, such as video cameras, still image cameras, range measurement devices, weight measurement sensors, pressure measurement sensors, or combinations thereof. Cameras may be visible light cameras, infrared/thermal cameras, ultraviolet cameras, cameras sensitive to any other range along the electromagnetic spectrum, night vision cameras, or a combination thereof. Range measurement devices may include, for example, light detection and ranging (LIDAR) transceivers, radio detection and ranging (RADAR) transceivers, electromagnetic detection and ranging (EmDAR) transceivers using another range along the electromagnetic spectrum, sound detection and ranging (SODAR) transceivers, sound navigation and ranging (SONAR) transceivers, or combinations thereof. Range measurement devices may be used to measure speed of vehicles. The smart traffic system 102 may be at least partially stationary, or in some cases may be at least partially mobile, and may for example include sensors or other hardware mounted or otherwise located on and/or in another vehicle other than the vehicle 108. The sensors of the smart traffic system 102 may also include a Visual Average Speed Computer And Recorder (VASCAR) sensor or other sensor for tracking speeds of vehicles.

The smart traffic system 102 is connected to a cloud based network 106 to receive location based information. The cloud based network 106 is a wide area network (WAN) capable of hosting and accessing data from remote servers. Further, the smart traffic system 102 establishes communication with a vehicle 108 to calibrate location based data of the vehicle 108. The vehicle 108 is a connected vehicle that can establish V2V, V2I, or I2V communications with other devices around, for example using dedicated short range communication (DSRC) wireless signal transfer or another wireless signal transfer protocol or technology discussed herein with respect to the input devices 1160 and/or output devices 1150 of FIG. 11. Examples of the vehicle 108 may include, but not limited to, autonomous vehicle, smart vehicle, driverless vehicle, and an automobile with communication capabilities. The term "autonomous vehicle" as used herein may refer to vehicles that may be categorized under any level of autonomy—including level zero, level one, level two, level three, level four, level five, a level not yet imagined, or an intermediate level—under the autonomy levels defined by the US Department of Transportation's National Highway Traffic Safety Administration (NHTSA). To calibrate location based data, the smart traffic system 102 includes further modules that communicate with other modules of the cloud based network 106 and the vehicle 108, and perform the required functionalities. The cloud based network 106 may be, for example, collection of servers operating a mapping and/or navigation service.

Figure 2:
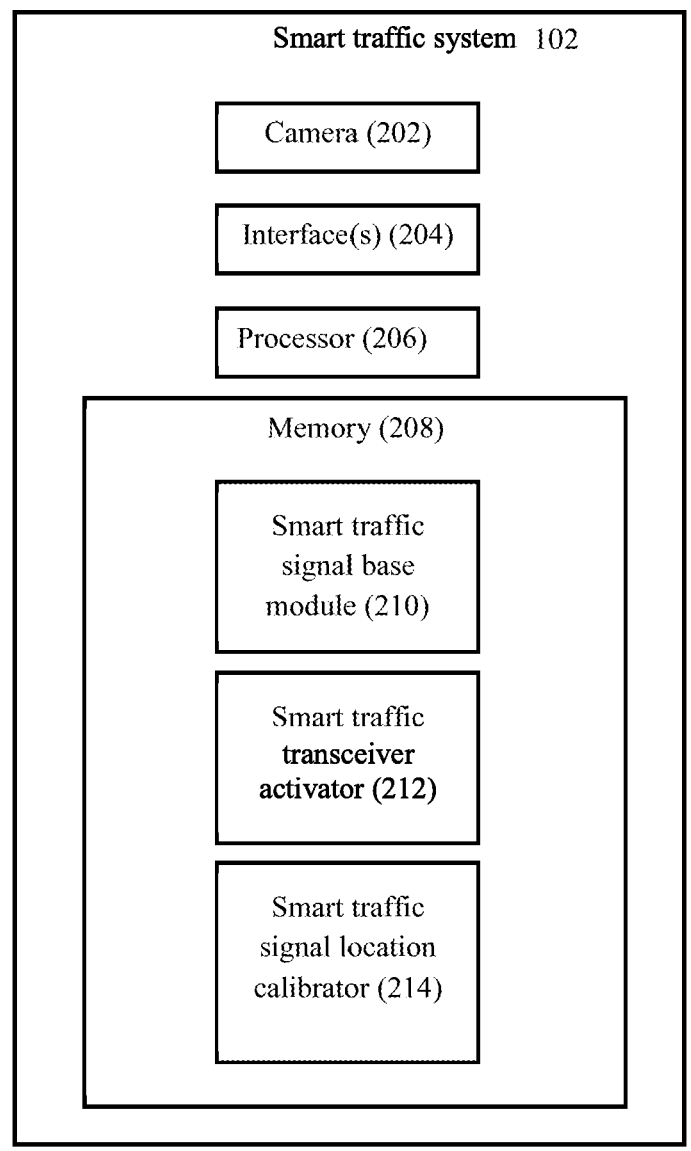
FIG. 2 illustrates a block diagram showing different components of the traffic signal system.

FIG. 2 illustrates a block diagram showing different components of the traffic signal system. The smart traffic system 102 includes a camera and/or other sensors 202 as discussed above, for capturing images and/or other spatial data of an area in range of the camera and/or other sensors 202 illustrated in FIG. 2 and around the smart traffic system 102. The term "camera" as recited herein thus implies presence and/or use of a camera and/or other sensors such as radar, LIDAR, thermal imaging device, and/or any other sensors discussed elsewhere herein with respect to the smart traffic system 102 and/or with respect to the computing device 1000.

The camera 202 visually and/or otherwise captures spatial data of the area around the smart traffic system 102 and provides that data to an intersection location database 110. The intersection location database 110 further receives location coordinates—such as longitude and latitude coordinates—from a global navigation satellite system (GNSS) positioning database through a network base module 210. The GNSS positioning database and the network base module 210 may be part of the cloud based network 106. The GNSS positioning database provides GNSS location coordinates of the area captured by the camera 202. The GNSS location coordinates are mapped with the spatial data by determining a range of the camera 202, then dividing that range into various grid cells. Thereafter, mapping the GNSS location coordinates of each grid cell to store the grid cell coordinates in the intersection location database 110.

The smart traffic system 102 initiates a process for establishing communication with one or more vehicles 108 in a vicinity of the smart traffic system 102, where the vicinity may be defined as a predetermined area such as an area within a predetermined distance/radius around the smart traffic system, the effective communication range of one or more wireless communications interfaces (for example short-range wireless communication interfaces) of the smart traffic system 102 and/or of the vehicle(s) 108 that it hopes to communicate with, the effective range at which the cameras 202 (or other sensors such as RADAR or LIDAR) can capture and/or recognize a vehicle 108, or some combination thereof. This process is initiated by a smart traffic system transceiver activator 212. The smart traffic system transceiver activator 212 identifies vehicles that enter in the range of the camera 202, for example using image recognition or feature recognition functions. In one embodiment, as the vehicle 108 enters the range of the camera 202, the smart traffic system transceiver activator 212 initiates a communication request with the vehicle 108 and a CV base module 116 of the vehicle 108 gets connected to a smart traffic system base module 210.

The smart traffic system base module 210 connects to the vehicle 108 and sends a request to access location data of the vehicle 108, to the CV base module 116. The CV base module 116 stores GNSS location data in a Vehicle GNSS database 114. The GNSS location data stored in the Vehicle GNSS database 114 is retrieved and sent to the smart traffic system base module 210. The smart traffic system base module 210 then initiates a smart traffic system location calibrator calibrator 214. The smart traffic system location calibrator 214 determines the grid cell for the location of the vehicle 108 and extracts corresponding GNSS location coordinates from the intersection location database.

Thereafter, the extracted GNSS location data corresponding to a location of the vehicle 108 is compared with the GNSS location coordinates as available with the smart traffic signal system 102. If the extracted GNSS location information is the same, the process ends. However, if there is difference or deviation between the GNSS location data gathered from the vehicle 108 and the GNSS location data gathered from the smart traffic signal system 102, either set of GNSS location data may be calibrated using a smart traffic system location calibrator 214. The GNSS location coordinates stored at the intersection location database 110 may be considered to be the "true" GNSS location value, and the difference between the two GNSS location data points is the change needed to be calibrated by the vehicle 108. In addition to the distance, a direction or heading of adjustment—that is, a direction or heading of a vector between the two GNSS locations data points—may be gathered. Accordingly, a location calibration database 112 is updated and is sent to the CV Base module 116 of the vehicle 108. The CV Base module 116 receives the location calibration database 126 and adjusts all future GNSS location readings gathered by the vehicle's positioning device based on the difference and/or direction between the two GNSS location data points—and any other data stored in the location calibration database 112. For example, if the GNSS location in the intersection location database 110 is two meters east of the GNSS location gathered by the positioning receiver of the vehicle 108, then the smart traffic system location calibrator 214 may suggest to the vehicle 108 that all future location readings from the positioning receiver of the vehicle 108 should be adjusted by moving them two meters to the east. More precise directions and headings may be provided in degrees or radians, for example.

The data is stored in the location calibration database 112 over a period of time. The smart traffic system base module 210 learns the patterns developed over this period of time for the inaccurate calibration of the location data of the vehicle 108. The smart traffic system 102 is configured to perform self-learning of the calibration based pattern. The smart traffic system 102 enables the smart traffic system base module 210 to send potential learned calibration of the inaccurate GNSS location of an autonomous vehicle and adjust it automatically.

Over time, multiple such remembered adjustments and calibrations may be averaged, and outliers may be removed, in order to continually improve accuracy of the positioning receiver of the vehicle 108. For example, if the vehicle 108 receives ten suggestions to adjust its positioning receiver's GNSS locations along a particular vector (distance and direction), the vector that the vehicle 108 ultimately uses may be an average vector representative of an average (e.g., mean) of all ten adjustment vectors. Such an average vector may be computed based on an average of each component—that is, a latitude component and a longitude component—of each vector. Alternately, such a vector may be computed using vector addition, and division of the resulting sum vector by the number of vectors (here, ten). The average calculation may optionally factor in an additional (eleventh) zero-distance vector representative of no change from the vehicle 108's positioning receiver's measured GNSS location to bias the positioning receiver against making too large a change unless it consistently receives calibration data indicating that its measurements are incorrect.

The smart traffic system location calibrator 214 acquires data from the proximity sensors located in the connected vehicle 108, such as LIDAR, radar, sonar, optical or other distance measuring sensors, to check the accuracy of the location data. In a scenario of the given embodiment, consider that proximity sensors are located in the vehicle 108 to determine the positions of objects in the surroundings of the vehicle 108. The smart traffic system base module 210 determines the GNSS location coordinates of the vehicle 108, the distance of an object detected by the proximity sensors of the connected vehicle from the vehicle 108, and the difference between the GNSS location coordinates of the grid cells occupied by the vehicle 108 and a detected object. The GNSS location data of the vehicle 108 depicts that the connected vehicle is 2 feet away from the detected object while the proximity sensor shows that the connected vehicle is 3 feet away from the detected object. The difference in the GNSS location data points—and the direction of a vector between them—is detected by the smart traffic system location calibrator 214 that sends a prompt to the vehicle 108 to calibrate the proximity sensor based on that distance and direction as discussed above.

The smart traffic system 102 may use cameras 202 and/or sensors 202 to identify a location of a vehicle 108 relative to the location of the cameras 202 and/or sensors 202. If the cameras 202 and/or sensors 202 have a known position, for example as based on measurements of a GNSS positioning receiver of the smart traffic system 102 or as measured before/during/after installation of the cameras 202 and/or sensors 202, then these measurements of the location of the vehicle 108 relative to the location of the cameras 202 and/or sensors 202 may be used as the "true" location of the vehicle 108 upon which to base the calibration recommendation sent to the vehicle 108.

The block diagram of FIG. 2 shows different components of the smart traffic system 102. The smart traffic system 102 includes the camera and/or other spatial sensors 202 as discussed herein. The camera 202 and/or other spatial sensors 202 are utilized to capture spatial data and/or measurements of one or more areas around or within a defined range of the smart traffic system 102. The smart traffic system 102 further comprises interface(s) 204, a processor 206 and a memory 208. The interface(s) 204 may help an operator to interact with the traffic control system 102. The interface(s) 204 of the system 102 may either accept an input from the operator or provide an output to the operator, or may perform both the actions. The interface(s) 204 may either be a Command Line Interface (CLI), Graphical User Interface (GUI), or a voice interface. The interface(s) 204 may alternately or additionally be or include any input devices 1160 and/or output devices 1150 and/or display systems 1170 and/or peripherals 1180 as illustrated in and discussed with respect to FIG. 11.

The processor 206 may execute an algorithm stored in the memory 208 for calibrating location data of a vehicle, such as the vehicle 106 in FIG. 1. The processor 206 may also be configured to decode and execute any instructions received from one or more other electronic devices or server(s). The processor 206 may include one or more general purpose processors (e.g., INTEL® or Advanced Micro Devices® (AMD) microprocessors) and/or one or more special purpose processors (e.g., digital signal processors or Xilinx® System On Chip (SOC) Field Programmable Gate Array (FPGA) processor). The processor 206 may be configured to execute one or more computer-readable program instructions, such as program instructions to carry out any of the functions described in this description. The processor 206 may alternately or additionally be or include any processor 1110 as illustrated in and discussed with respect to FIG. 11.

The memory 208 may include, but is not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions. The memory 208 may alternately or additionally be or include any memory 1120, mass storage 1130, and/or portable storage 1140 as illustrated in and discussed with respect to FIG. 11.

The memory 208 may comprise instructions organized into modules implemented as program via execution by the processor 206. In one case, the memory 208 may comprise a smart traffic signal base module 210 for performing various functionalities of the smart traffic system 102. The smart traffic system base module 210 may include further modules to perform required actions (not shown in the figure). The modules will be explained further in conjunction with FIG. 3.

Figure 3:
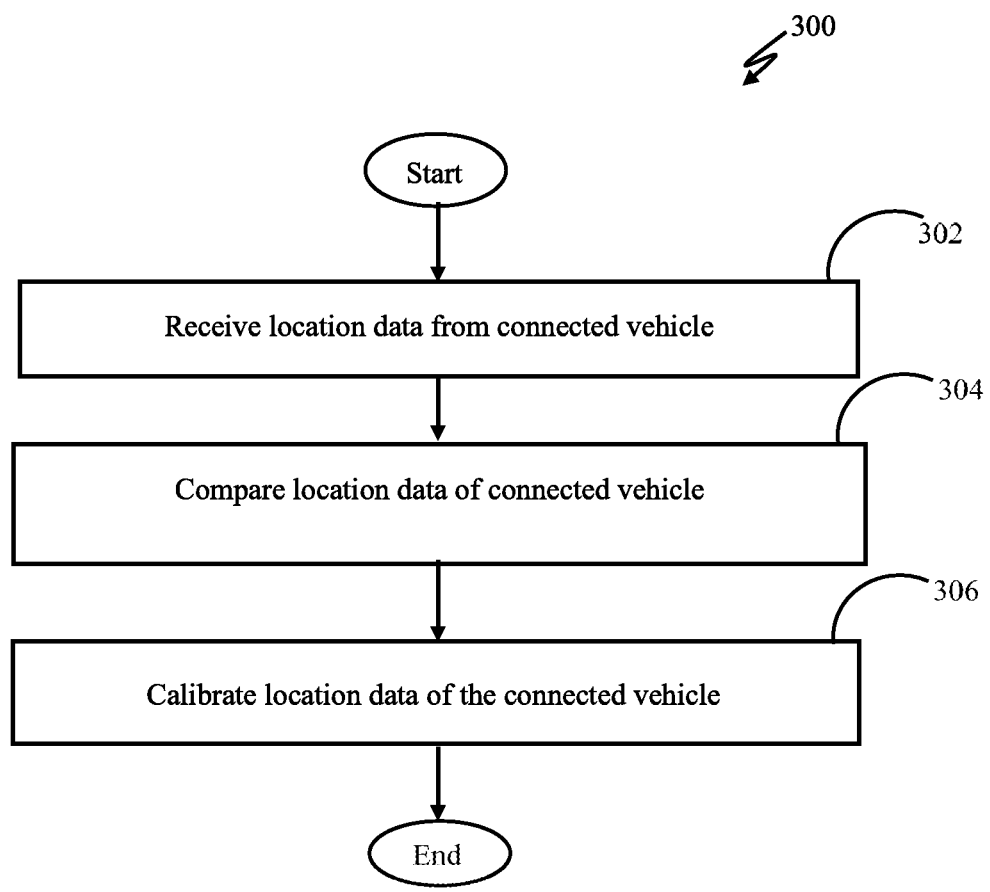
FIG. 3 is a flow diagram illustrating calibration of a positioning receiver of a connected vehicle that corrects location data corresponding to the connected vehicle.

FIG. 3 is a flow diagram illustrating calibration of a positioning receiver of a connected vehicle that corrects location data corresponding to the connected vehicle. The smart traffic system base module 210 may include a data receiving module for receiving GNSS location data from a vehicle, like vehicle 108 as shown in FIG. 1, which may be used in tandem with hardware such as a receiver, transceiver, and/or other input device 1060 that receives signals conveying such data that are then interpreted by the processor 206 running the data receiving module.

The data receiving module, at step 302 of the flow diagram 300, may receive location based sensor data from the vehicle while the vehicle is present in vicinity of the smart traffic system 102. As the vehicle enters into the spatial-data capturing zone of the smart traffic system 102, communication is triggered between the vehicle and the smart traffic system 102. Thereafter, sensor data of the vehicle corresponding to GNSS location is extracted and provided to the data receiving module.

The extracted GNSS location data is then provided to a data comparing module. The data comparing module, at step 304 of the flow diagram 300, may compare the GNSS location data with a predetermined location data available at the smart traffic system 102. The predetermined location data is a prior calculated GNSS coordinate of location of the vehicle. The predetermined location data is pre-calculated for the area captured by the camera and/or other sensors 202. In an embodiment, the data comparing module compares and identifies deviation between the GNSS location data of the vehicle and the predetermined location data. Based on the identified deviation, calibration of the GNSS location data of the vehicle is performed by a smart traffic system location calibrator 214, at step 306 of the flow diagram 300. In the given embodiment, while deviation is identified, the smart traffic system location calibrator 214 provides a calibrated GNSS location data to the vehicle. However, if no deviation is identified, the process is not pursued further.

Memory 208 further includes a smart traffic system transceiver activator 212 for triggering communication between the smart traffic system 102 and the vehicle 108. This is explained in detail in conjunction with figures below.

Figure 4:
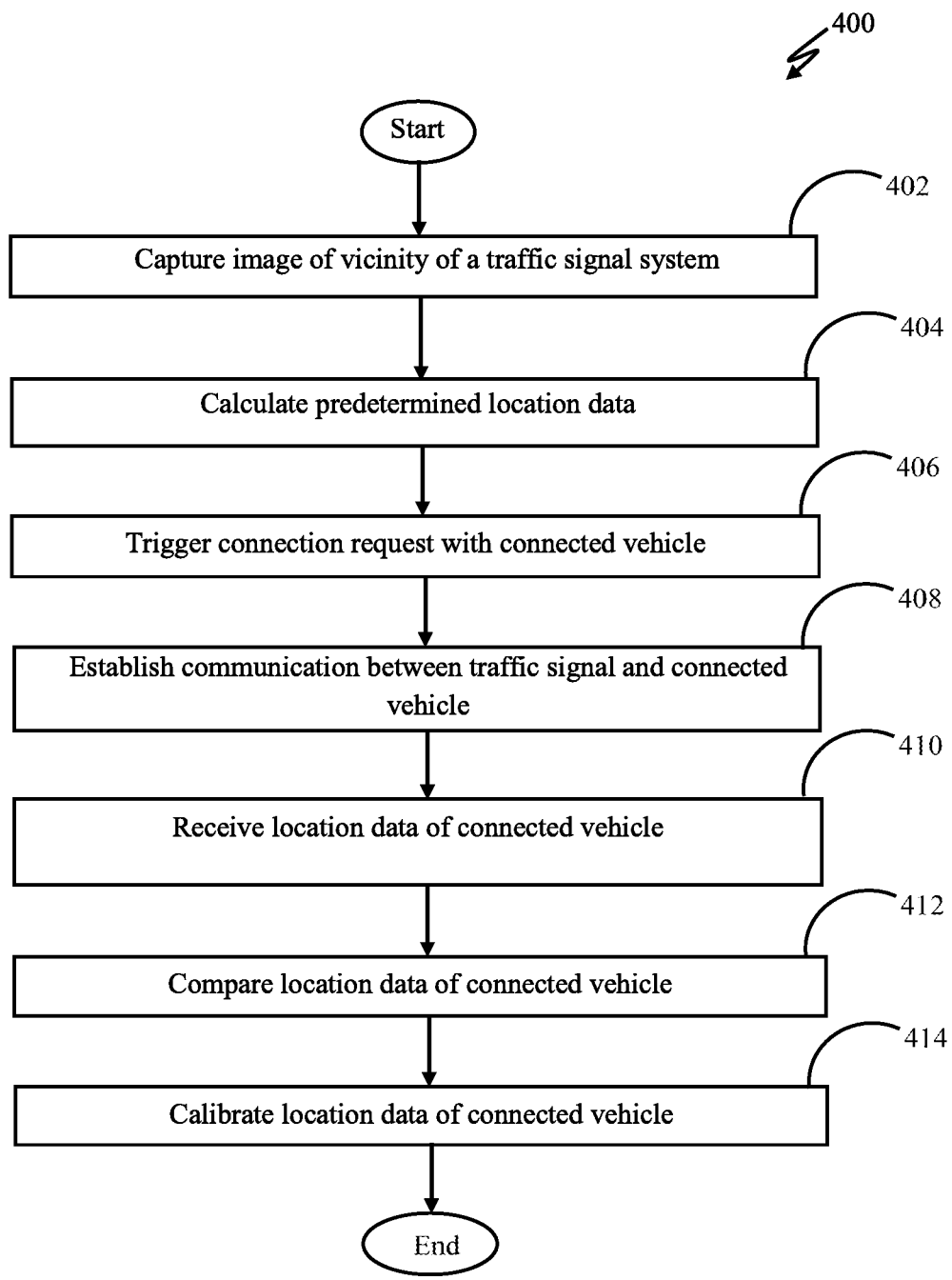
FIG. 4 is a flow diagram illustrating connectivity between a vehicle and traffic infrastructure hardware triggering calibration of a positioning receiver of the connected to correct location data corresponding to the connected vehicle.

FIG. 4 is a flow diagram illustrating connectivity between a vehicle and traffic infrastructure hardware triggering calibration of a positioning receiver of the connected to correct location data corresponding to the connected vehicle.

In one case, an image and/or other spatial data of the vicinity of a smart traffic system may be captured, at step 402. The spatial data may be captured using a camera and/or other spatial sensors 202 such as radar, LIDAR, and/or thermal imagers. Successively, a predetermined location data may be calculated corresponding to an area of the captured image, at step 404. The captured image may be utilized to determine range of the camera 202 and divide the range into multiple grid cells. The smart traffic system base module 210 then connects to network 104 and receives data from a GNSS database. The GNSS database comprises GNSS location coordinates of the visual range. The smart traffic system base module 210 maps the GNSS location coordinates of each grid cell to identify the predetermined location data.

Thereafter, a connection request for connecting with the connected vehicle may be triggered, at step 406. The connection request may be triggered using a smart traffic system transceiver activator 212. The smart traffic system transceiver activator 212 may continuously poll connected vehicles that enter the range of the camera 202.

As a new connected vehicle enters the range, a communication is established between the smart traffic system and the vehicle, at step 408. The smart traffic system transceiver activator 212 returns to the smart traffic system base module 210 after connection with the vehicle 108 is established. The location data of the connected vehicle may be received, at step 410. The location data may be received using the smart traffic system base module 210. Access to a CV GNSS database is made and sent from a CV base module to the smart traffic system base module 210.

Successively, location data of the vehicle may be compared with the predetermined location data, at step 412. The location data may be compared using a smart traffic system location calibrator 214. The smart traffic system may acquire data from one or more proximity sensors located in the connected vehicle, such as lidar, radar, sonar, optical, or other distance measuring sensors, to check the accuracy of the data. For instance, the proximity sensors located in the connected vehicle determine positions of objects in surroundings of the connected vehicle. The smart traffic system base module 210 may determine the GNSS location coordinates of the connected vehicle, the distance of an object detected by the proximity sensors from the vehicle, and the difference between the GNSS location coordinates of the grid cells occupied by the connected vehicle and a detected object. The GNSS location data of the connected vehicle may depict that the connected vehicle is 2 feet away from the detected object while the proximity sensor shows that the connected vehicle is 3 feet away from the detected object. The difference in the GNSS location data points is detected by the smart traffic system location calibrator 124 which sends a prompt to the connected vehicle to calibrate the proximity sensor.

Finally, the location data of the connected vehicle may be calibrated using the smart traffic system location calibrator 214, at step 414. The module may send a prompt to the connected vehicle to calibrate location data of the connected vehicle.

Figure 5A:
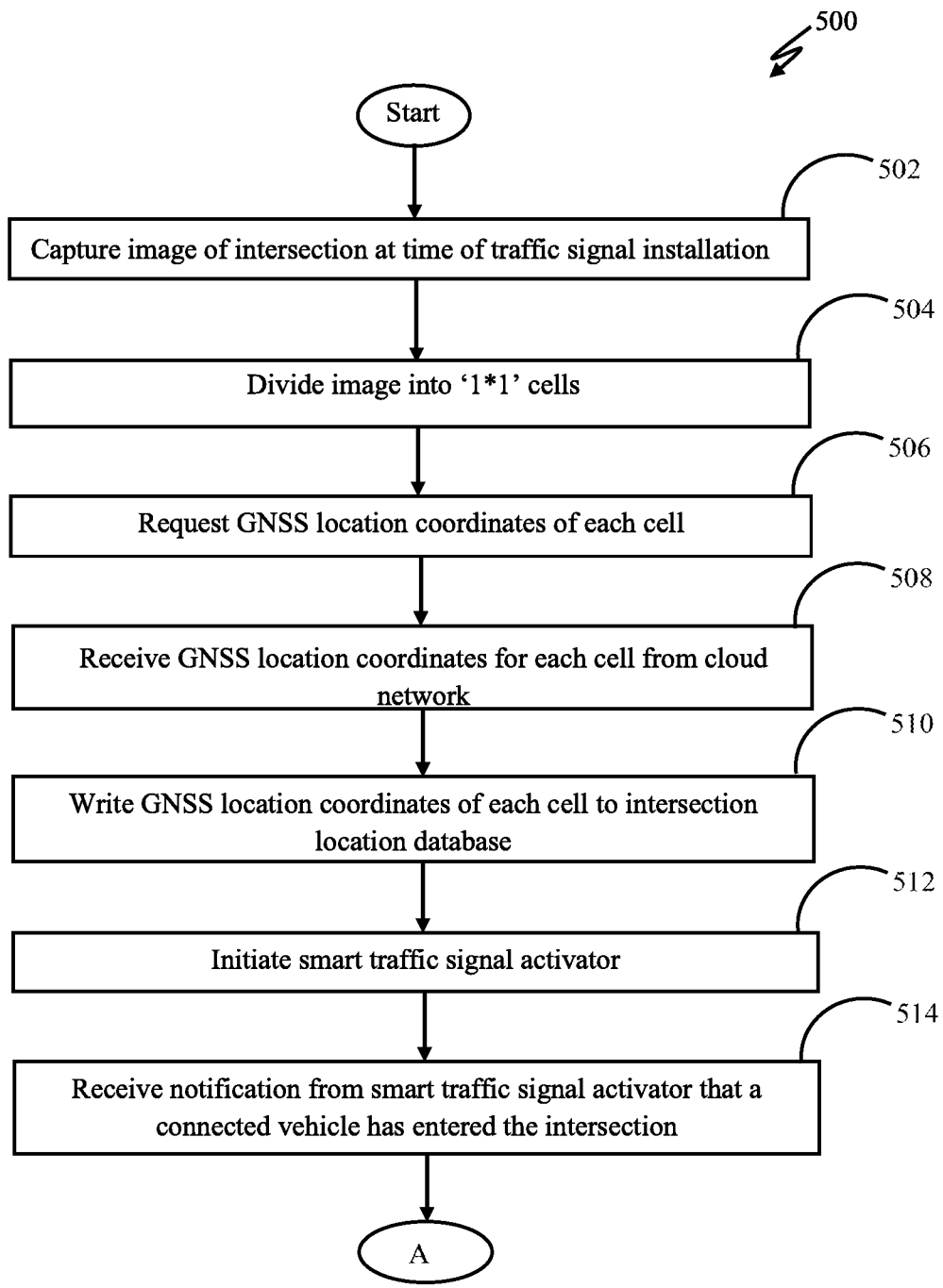
FIG. 5A is a first portion of a flow diagram illustrating visual analysis, communication activation, and positioning calibration operations of the smart traffic system and its base module.

FIG. 5A is a first portion of a flow diagram illustrating visual analysis, communication activation, and positioning calibration operations of the smart traffic system and its base module. An image or other spatial data of an intersection may be captured, at step 502. The spatial data may be captured at a time of installation of the traffic system and may be stored in an intersection location database 110. The image is divided into 1'×1' cells, at step 504. Thereafter, a request may be made to obtain GNSS location coordinates of each cell of the image, at step 506. GNSS location coordinates for each cell may then be received from a cloud network 104, at step 508.

Successively, GNSS location coordinates of each cell may be written to the intersection location database 110, at step 510. Smart traffic system transceiver activator 212 may be initiated, at step 512. A notification from a smart traffic system transceiver activator 212 may be initiated to notify that a connected vehicle has entered the intersection, at step 514.

Figure 5B:
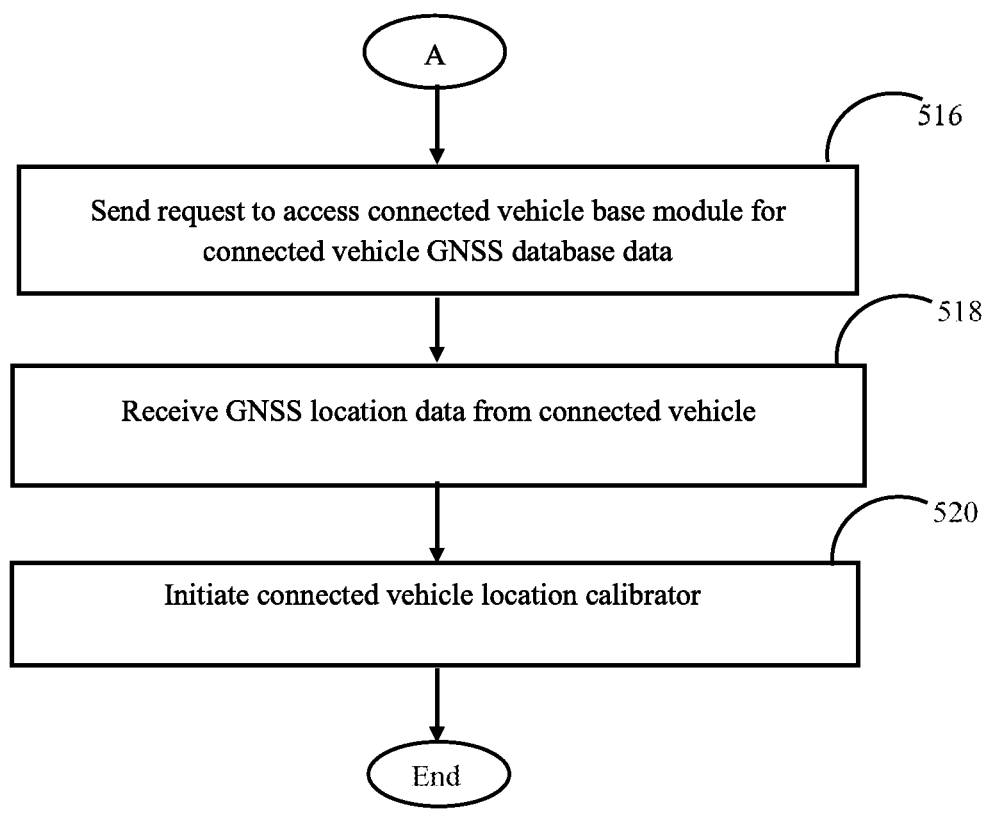
FIG. 5B is a second portion of the flow diagram of FIG. 5A illustrating visual analysis and communication trigger/activation operations of the smart traffic system and its base module.

FIG. 5B is a second portion of the flow diagram of FIG. 5A illustrating visual analysis and communication trigger/activation operations of the smart traffic system and its base module. Following receipt of the notification at step 514, a request may be sent to access a CV base module, at step 516. The request may be sent for location data on the connected vehicle GNSS Database 114. In response, GNSS location data from connected vehicle may be received, at step 518. Thereafter, calibration of location data of the connected vehicle may be initiated, at step 520.

Figure 6:
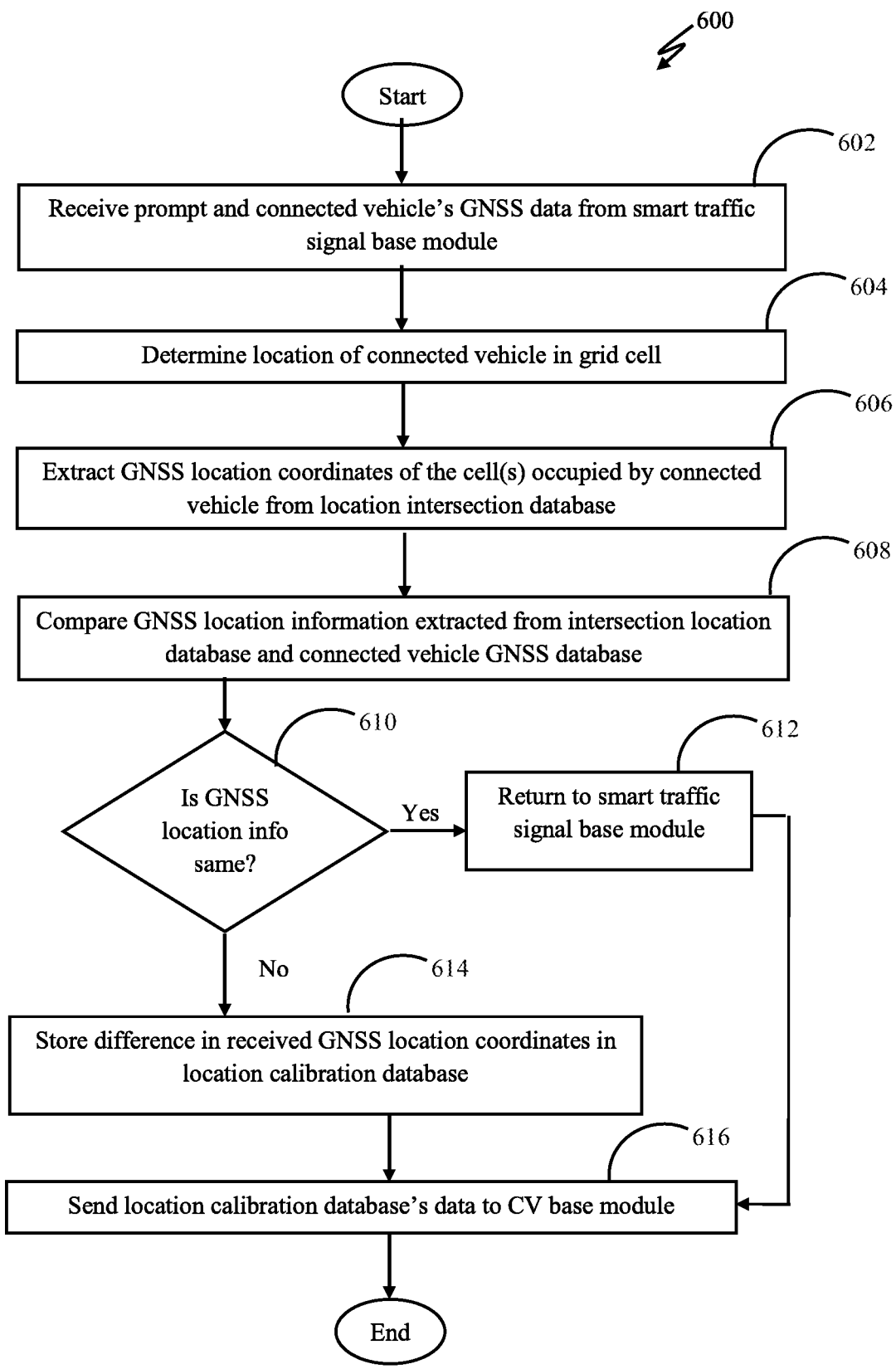
FIG. 6 is a flow diagram illustrating location comparison operations of the smart traffic system calibrator.

FIG. 6 is a flow diagram illustrating location comparison operations of the smart traffic system calibrator. Prompt and GNSS location data of a connected vehicle may be received from smart traffic system base module 210, at step 602. Thereafter, location of the connected vehicle may be determined in the grid cell, at step 604. The GNSS location coordinates may be extracted of the cell(s) occupied by the connected vehicle from intersection location database, at step 506. Successively, GNSS location information extracted from the intersection location database 110 and connected vehicle's GNSS database may be compared, at step 608.

Thereafter, it is checked if the GNSS location information is same or not, at step 610. If the GNSS location information is same, then at step 612, process is returned to a smart traffic system base module 210. If the GNSS location information is not same then at step 614, the difference in received GNSS location coordinates is stored in a location calibration database 112. Thereafter, at step 616, location calibration database's data may be sent to a CV base module.

Figure 7:
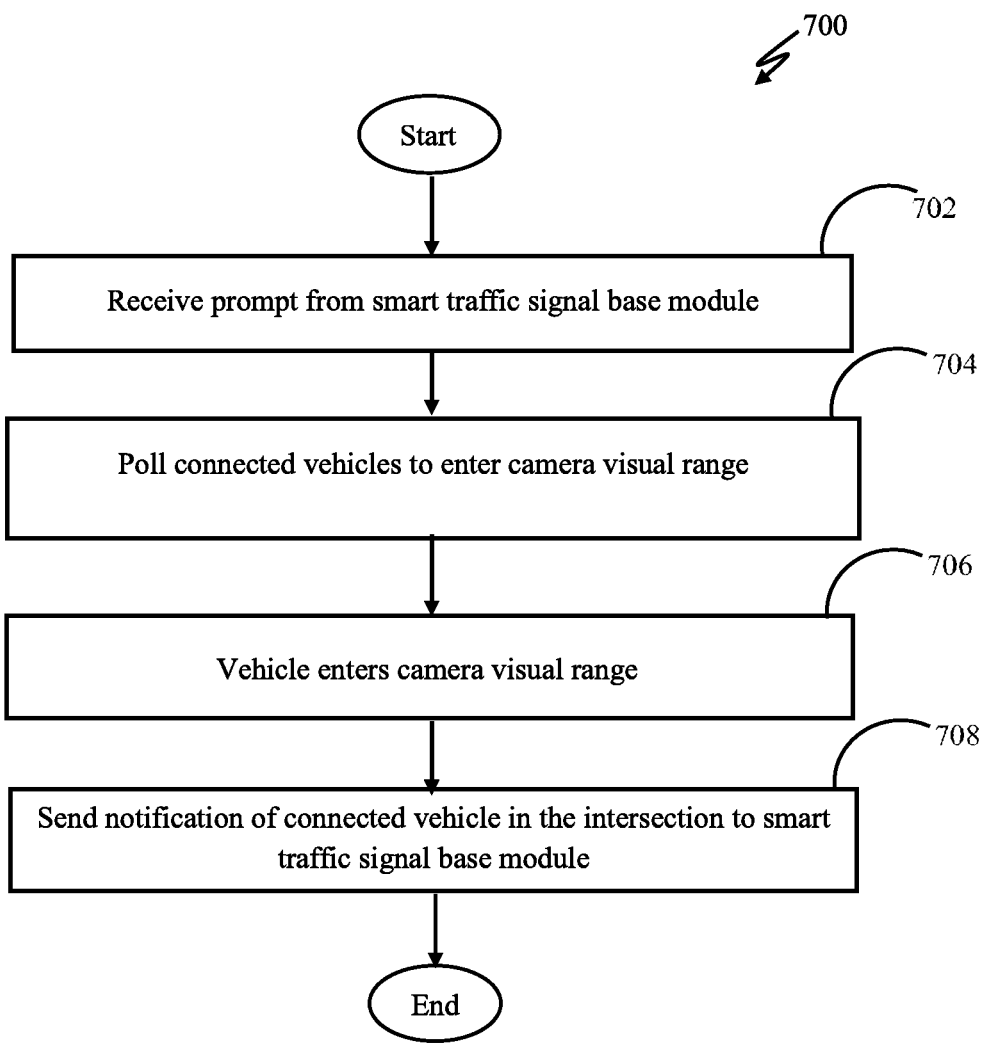
FIG. 7 is a flow diagram illustrating visual analysis, communication activation, and positioning calibration operations though the smart traffic system transceiver activator.

FIG. 7 is a flow diagram illustrating visual analysis, communication activation, and positioning calibration operations though the smart traffic system transceiver activator. The flowchart 700 of FIG. 7 shows functionalities of the smart traffic system transceiver activator 212. At step 702 of the flow diagram 800, a prompt may be received from the smart traffic system base module 210 to initiate polling. Successively, the smart traffic system transceiver activator 212 may continuously poll connected vehicles that enter the range of the camera, at step 704. Thereafter, the vehicle entering the range of the camera may be detected, at step 706. Finally, at step 708, a notification of the vehicle in the intersection of the range of the camera may be sent to the smart traffic system base module 210.

Figure 8:
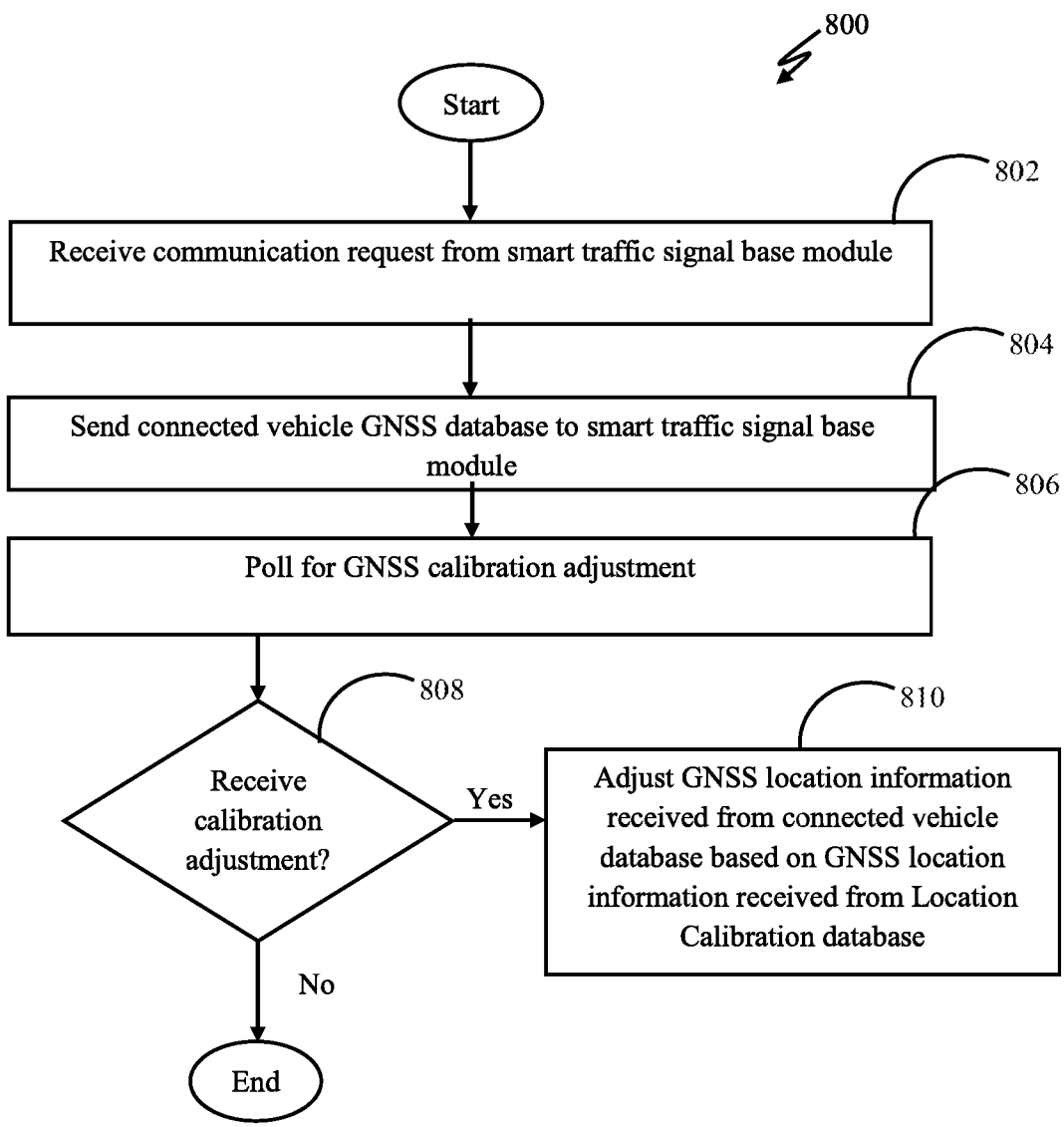
FIG. 8 is a flow diagram illustrating a connectivity and calibration operations of the CV base module of the vehicle.

FIG. 8 is a flow diagram illustrating a connectivity and calibration operations of the CV base module of the vehicle.

At step 802 of the flow diagram 800, a communication request may be received from the smart traffic system base module 210 by the CV base module 116. The CV base module 116 may be the main functional module of the connected vehicle.

At step 804, connection may be established between the CV base module 116 and the smart traffic system base module 210. Further, data may be sent from a connected vehicle GNSS database to the smart traffic system base module 210. The CV Base module 116 may continuously receive GNSS location information and stores the information locally at the connected vehicle GNSS database.

The vehicle polls for GNSS calibration adjustment at step 806. At step 808, the CV base module 116 may receive calibrated GNSS location data of the connected vehicle from a location calibration database available at the smart traffic system 102. The calibrated GNSS location data may be adjusted based on deviation of the previously stored GNSS location information from correct data.

At step 810, the calibrated GNSS data as received from the location calibration database may be adjusted at the connected vehicle GNSS database.

Figure 9:
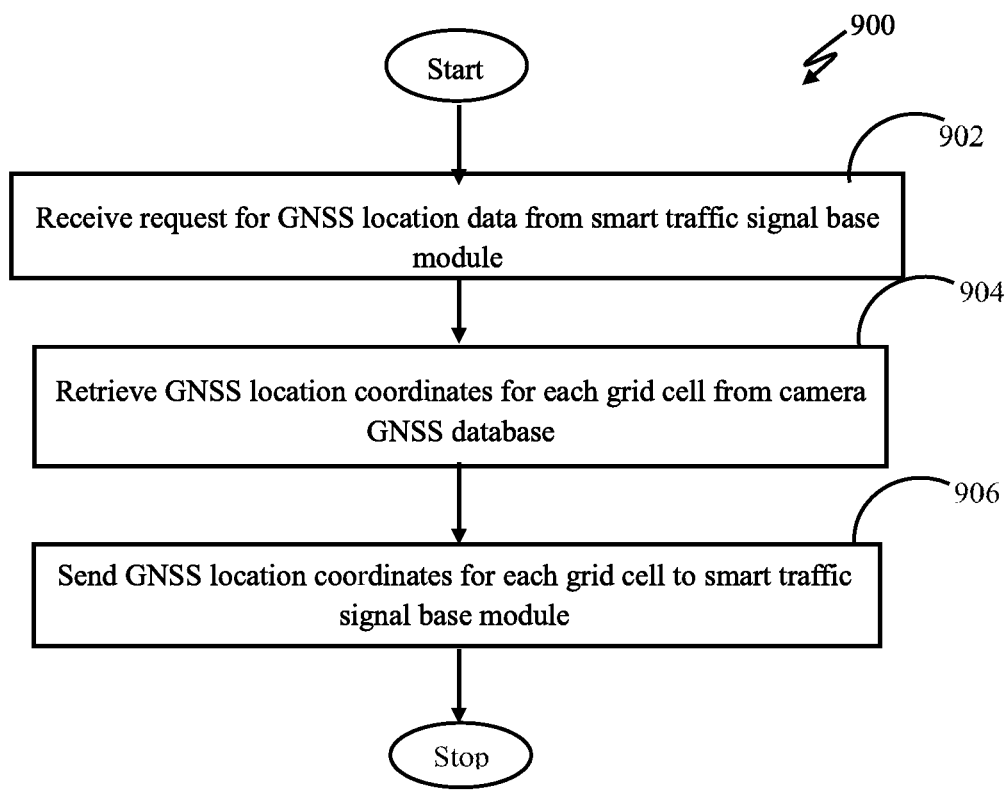
FIG. 9 is a flow diagram illustrating location retrieval and positioning calibration operations of a network base module.

FIG. 9 is a flow diagram illustrating location retrieval and positioning calibration operations of a network base module.

At step 902 of the flow diagram 900, a request for GNSS location data is received from the smart traffic system base module 210 by the network base module. The network base module may be functional module of the cloud based network 106. The network base module establishes communication between the smart traffic system 102 and the vehicle 108.

At step 904, the network base module retrieves GNSS location coordinates for each grid cell from a camera GNSS database available at the cloud based network 106.

Finally, at step 906, the network base module sends the GNSS location coordinates for each grid cell to the smart traffic signal base module 210.

Figure 10:
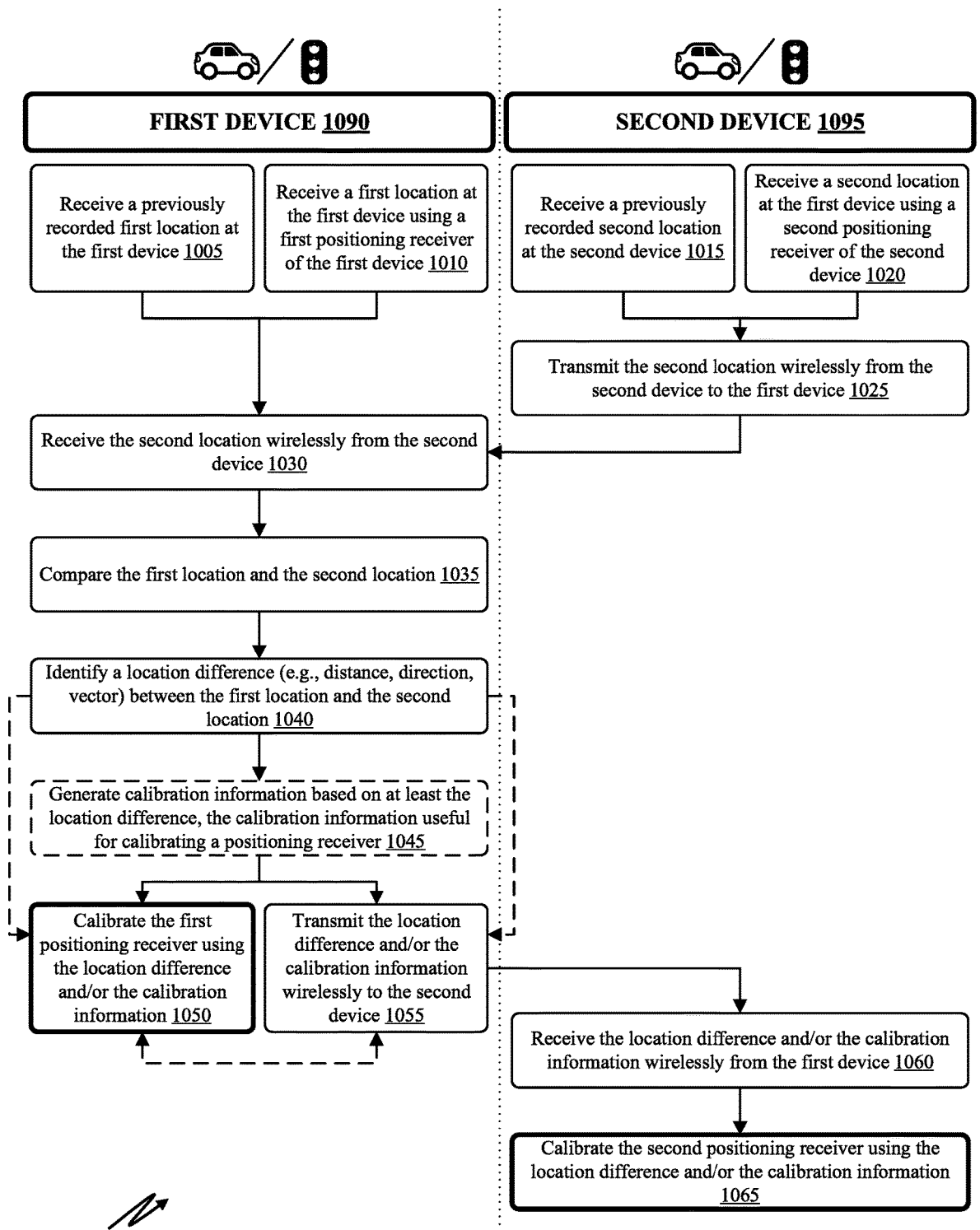
FIG. 10 is a swim lane diagram illustrating calibration of a positioning receiver using a system with multiple devices.

FIG. 10 is a swim lane diagram 1000 illustrating vehicle positioning receiver calibration according to some embodiments. The swim lane diagram of FIG. 10 illustrates two columns respectively corresponding to two devices—a first device 1090 and a second device 1095. Either or both of the first device 1090 and the second device 1095 may be a vehicle, as indicated by the automobile icon at the top of each column corresponding to each device 1090/1095. Either or both of the first device 1090 and the second device 1095 may be a traffic infrastructure device/system, as indicated by the traffic light icon at the top of each column corresponding to each device 1090/1095.

At step 1005 or step 1010, the first device 1090 receives a first location. If step 1005 is used, the first location is previously recorded. For example, if the first device 1090 is a stationary traffic infrastructure device, the first location may be recorded rarely or upon installation of the traffic infrastructure device at its location. If step 1010 is used, the first location is received from a first positioning device of the first device 1090. For example, if the first device 1090 is a vehicle or a mobile traffic infrastructure device, the first location may be measured by the first positioning device periodically as the first device 1090 travels along a route or otherwise moves. Additional information may also be received from the first positioning device or generated by the first device 1090 alongside receipt of the first location at either step 1005 or step 1010, such as a timestamp of measurement of the first location and/or of receipt of the first location, an identification of the basis of the first location (prior recording, type of positioning device, etc.), or combinations thereof.

At step 1015 or step 1020, the second device 1095 receives a second location. If step 1015 is used, the second location is previously recorded. For example, if the second device 1095 is a stationary traffic infrastructure device, the second location may be recorded rarely or upon installation of the traffic infrastructure device at its location. If step 1020 is used, the second location is received from a second positioning device of the second device 1095. For example, if the second device 1095 is a vehicle or a mobile traffic infrastructure device, the second location may be measured by the second positioning device periodically as the first device 1090 travels along a route or otherwise moves. Additional information may also be received from the second positioning device or generated by the second device 1095 alongside receipt of the second location at either step 1015 or step 1020, such as a timestamp of measurement of the first location and/or of receipt of the first location, an identification of the basis of the first location (prior recording, type of positioning device, etc.), or combinations thereof.

At step 1025, the second device 1095 wirelessly transmits the second location (and optionally any of the additional information mentioned above such as timestamps) to the first device 1090. At step 1030, the first device 1090 wirelessly receives the second location (and optionally any of the additional information mentioned above such as timestamps) from the second device 1095. The wireless communication of steps 1025 and 1030 may use wireless protocols and/or wireless communication transmitters, receivers, and/or transceivers of the first device 1090 and second device 1095 of any type discussed with respect to the input devices 1160 and/or output devices 1150 of FIG. 11. For example, short-range wireless protocols and transceiver hardware may be used that is appropriate for as BLUETOOTH® wireless signal transfer, BLUETOOTH® low energy (BLE) wireless signal transfer, IBEACON® wireless signal transfer, radio wireless signal transfer, microwave wireless signal transfer, audio signal transfer, radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, cellular wireless signal transfer, or any other type of wireless signal transfer discussed herein.

At step 1035, the first device 1090 compares the first location and the second location. At step 1040, the first device 1090 identifies a location difference between the first location and the second location. That is, at step 1040, the first device 1090 identifies that the first location and the second location are not identical, and identifies a manner in which to represent a difference between the first location and the second location. The first location and second location may be locations along a coordinate system, such as a coordinate system tracking latitude, longitude, and/or altitude/elevation. The location difference identified in step 1040 may include a distance between the first location and the second location based on this coordinate system. The location difference identified in step 1040 may include a direction, heading, bearing, radial, pitch, roll, yaw, azimuth, or some combination thereof. The location difference identified in step 1040 may include a vector in two-dimensional space (if only latitude and longitude are used) or a vector in three-dimensional space (if only latitude, longitude, and altitude are used), the vector having a magnitude (distance) and a direction (direction, heading, bearing, radial, pitch, roll, yaw, azimuth, or some combination thereof).

At step 1045, the first device 1090 may optionally generate calibration information based on at least the location difference identified in step 1040, the calibration information useful for calibrating a positioning receiver. The calibration information may modify or convert the location difference identified in step 1040 from one format into another format that is more useful in calibrating a positioning receiver. The calibration information may take into account other previous calibrations, for example by calculating an average vector for calibration as discussed herein. In some cases, step 1045 may be bypassed, and step 1040 may lead directly to step 1050 or step 1055.

At step 1050, the first device 1090 calibrates the first positioning receiver using the location difference identified in step 1040 and/or the calibration information generated in step 1045. The calibration of the first positioning receiver improves the accuracy of the first positioning receiver by adjusting its location measurements along a vector (distance, direction, heading, bearing, radial, pitch, roll, yaw, azimuth, or some combination thereof) that is based on the location difference identified in step 1040 and/or the calibration information generated in step 1045. The calibration of the first positioning receiver improves the accuracy of the first positioning receiver by adjusting its location measurements along the vector either during measurement by the first positioning receiver or after measurement by the first positioning receiver (optionally by another device such as a processor of the first device 1090 that receives location data from the first positioning receiver). In some cases, past location data gathered/measured by the first positioning receiver before identification of the location difference identified in step 1040 and/or the calibration information generated in step 1045 may be retroactively corrected and/or calibrated based on the vector as well.

At step 1055, the first device 1090 transmits the location difference identified in step 1040 and/or the calibration information generated in step 1045 wirelessly to the second device 1055. At step 1060, the second device receives the location difference identified in step 1040 and/or the calibration information generated in step 1045 wirelessly from the first device 1090. The wireless transmission of steps 1055 and/or 1060 may be of any type discussed with respect to steps 1025 and/or 1035.

At step 1065, the second device 1095 calibrates the second positioning receiver using the location difference identified in step 1040 and/or the calibration information generated in step 1045. The calibration of the second positioning receiver improves the accuracy of the second positioning receiver by adjusting its location measurements along a vector (distance, direction, heading, bearing, radial, pitch, roll, yaw, azimuth, or some combination thereof) that is based on the location difference identified in step 1040 and/or the calibration information generated in step 1045. The calibration of the second positioning receiver improves the accuracy of the second positioning receiver by adjusting its location measurements along the vector either during measurement by the second positioning receiver or after measurement by the second positioning receiver (optionally by another device such as a processor of the second device 1095 that receives location data from the second positioning receiver). In some cases, past location data gathered/measured by the second positioning receiver before identification of the location difference identified in step 1040 and/or the calibration information generated in step 1045 may be retroactively corrected and/or calibrated based on the vector as well.

In some cases, any of steps 1005, 1010, 1015, 1020, 1025, or 1030 may be triggered by the first device 1090 and second device 1095 coming into proximity with each other such that each is in the same area, or such that each is within a particular range/radius of each other. This area may be a predefined geofence with predefined borders, and the range/radius may likewise be a predefined range or radius. The proximity, range, radius, or area may in other cases simply refer to an effective range of wireless communications between the first device 1090 and second device 1095; for example, this may correspond to the range of one or both short-range wireless transceivers of the first device 1090 and/or second device 1095 as used in steps 1025, 1030, 1055, and/or 1060. In some cases, the radius or range for triggering any of the steps listed above may be a range of a camera 202 or other sensor of a traffic infrastructure device 102 or of a vehicle 108 as discussed with respect to FIG. 2, for example a range at which a vehicle 108 may be identified by the camera 202, or a range at which a license plate is sufficiently high-resolution in images captured by the by the camera 108 so as to be legible or mostly legible, or a range at which a driver or operator or passenger of the vehicle 108 may be recognized by the camera 202, or a range at which another type of sensor may detect the presence of and/or identify the vehicle or driver or operator in some way, or some combination thereof.

In some cases, the first location gathered in step 1005 and/or 1010 may represent a location of the first device 1090. In others, however, it may represent a location of the second device 1095. For example, if the first device 1090 is a traffic infrastructure device 102 with a camera or other sensor 202 that detects a vehicle 108 (the second device 1095), the first location gathered at step 1005 and/or 1010 may be the location of the first device 1090 offset by a distance and direction at which it detects the vehicle 108 (second device 1095). That is, if the first device 1090 is a camera, knows its location, knows the direction it is facing, and estimates based on its camera image/video and image/feature detection of the vehicle 108 (second device 1095) that the vehicle 108 (second device 1095) is ten feet directly in front of the camera, then the first location may be the location of the camera offset by ten feet in the direction the camera is facing, and is thus the location of the vehicle 108 (second device 1095). In the same way, the second location gathered in step 1015 and/or 1020 may be the location of the second device 1095, or may be the location of the first device 1090. In some cases, the location of the first device 1090 and the location of the second device 1095 may be the same location, such as when the first device 1090 is a vehicle 108 and the second device 1095 is a traffic infrastructure device 102 that is a sensor in the asphalt identifying pressure resulting from the vehicle 108 driving over it.

In some cases, such as the situation illustrated in and discussed with respect to FIG. 9, several steps may be performed by a server of a cloud-based network 106 or other computing device 1100 other than the first device 1090 and second device 1095, where the server or other computing device 1100 is optionally remote from the first device 1090 and second device 1095. For example, such a server or other computing device 1100 may perform step 1030, 1035, 1040, 1045, and/or 1055 if the first location and second location are sent to the server or other computing device 1100 after retrieval at steps 1005, 1010, 1015, and/or 1020. At or after any of the steps performed by the server or other computing device 1100, server or other computing device 1100 the may then send the locations, the location difference, or the calibration information to the first device 1090 and/or to the second device 1095.

Figure 11:
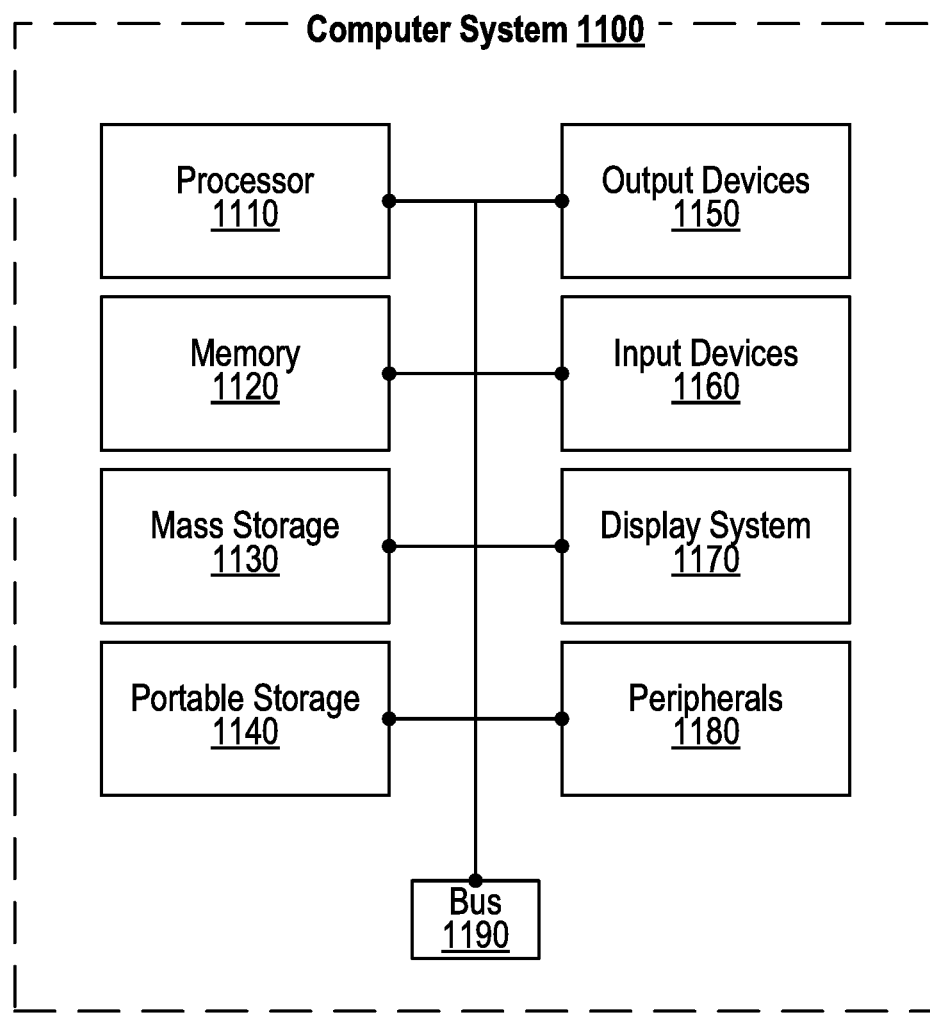
FIG. 11 is a block diagram of an exemplary computing device that may be used to implement some aspects of the positioning calibration technology.

FIG. 11 illustrates an exemplary computing system that may be used to implement some aspects of the positioning calibration technology. For example, any of the computing devices, computing systems, network devices, network systems, servers, and/or arrangements of circuitry described herein may include at least one computing system 1100, or may include at least one component of the computer system 1100 identified in FIG. 11. The computing system 1100 of FIG. 11 includes one or more processors 1110 and memory 1120. Each of the processor(s) 1110 may refer to one or more processors, controllers, microcontrollers, central processing units (CPUs), graphics processing units (GPUs), arithmetic logic units (ALUs), accelerated processing units (APUs), digital signal processors (DSPs), application specific integrated circuits (ASICs), field-programmable gate arrays (FPGAs), or combinations thereof. Each of the processor(s) 1110 may include one or more cores, either integrated onto a single chip or spread across multiple chips connected or coupled together. Memory 1120 stores, in part, instructions and data for execution by processor 1110. Memory 1120 can store the executable code when in operation. The system 1100 of FIG. 11 further includes a mass storage device 1130, portable storage medium drive(s) 1140, output devices 1150, user input devices 1160, a graphics display 1170, and peripheral devices 1180.

The components shown in FIG. 11 are depicted as being connected via a single bus 1190. However, the components may be connected through one or more data transport means. For example, processor unit 1110 and memory 1120 may be connected via a local microprocessor bus, and the mass storage device 1130, peripheral device(s) 1180, portable storage device 1140, and display system 1170 may be connected via one or more input/output (I/O) buses.

Mass storage device 1130, which may be implemented with a magnetic disk drive or an optical disk drive, is a non-volatile storage device for storing data and instructions for use by processor unit 1110. Mass storage device 1130 can store the system software for implementing some aspects of the subject technology for purposes of loading that software into memory 1120.

Portable storage device 1140 operates in conjunction with a portable non-volatile storage medium, such as a floppy disk, compact disk or Digital video disc, to input and output data and code to and from the computer system 1100 of FIG. 11. The system software for implementing aspects of the subject technology may be stored on such a portable medium and input to the computer system 1100 via the portable storage device 1140.

The memory 1120, mass storage device 1130, or portable storage 1140 may in some cases store sensitive information, such as transaction information, health information, or cryptographic keys, and may in some cases encrypt or decrypt such information with the aid of the processor 1110. The memory 1120, mass storage device 1130, or portable storage 1140 may in some cases store, at least in part, instructions, executable code, or other data for execution or processing by the processor 1110.

Output devices 1150 may include, for example, communication circuitry for outputting data through wired or wireless means, display circuitry for displaying data via a display screen, audio circuitry for outputting audio via headphones or a speaker, printer circuitry for printing data via a printer, or some combination thereof. The display screen may be any type of display discussed with respect to the display system 1170. The printer may be inkjet, laserjet, thermal, or some combination thereof. In some cases, the output device circuitry 1150 may allow for transmission of data over an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. Output devices 1150 may include any ports, plugs, antennae, wired or wireless transmitters, wired or wireless transceivers, or any other components necessary for or usable to implement the communication types listed above, such as cellular Subscriber Identity Module (SIM) cards.

Input devices 1160 may include circuitry providing a portion of a user interface. Input devices 1160 may include an alpha-numeric keypad, such as a keyboard, for inputting alpha-numeric and other information, or a pointing device, such as a mouse, a trackball, stylus, or cursor direction keys. Input devices 1160 may include touch-sensitive surfaces as well, either integrated with a display as in a touchscreen, or separate from a display as in a trackpad. Touch-sensitive surfaces may in some cases detect localized variable pressure or force detection. In some cases, the input device circuitry may allow for receipt of data over an audio jack, a microphone jack, a universal serial bus (USB) port/plug, an Apple® Lightning® port/plug, an Ethernet port/plug, a fiber optic port/plug, a proprietary wired port/plug, a wired local area network (LAN) port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, personal area network (PAN) signal transfer, wide area network (WAN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. Input devices 1160 may include any ports, plugs, antennae, wired or wireless receivers, wired or wireless transceivers, or any other components necessary for or usable to implement the communication types listed above, such as cellular SIM cards.

Input devices 1160 may include receivers or transceivers used for positioning of the computing system 1100 as well. These may include any of the wired or wireless signal receivers or transceivers. For example, a location of the computing system 1100 can be determined based on signal strength of signals as received at the computing system 1100 from three cellular network towers, a process known as cellular triangulation. Fewer than three cellular network towers can also be used—even one can be used—though the location determined from such data will be less precise (e.g., somewhere within a particular circle for one tower, somewhere along a line or within a relatively small area for two towers) than via triangulation. More than three cellular network towers can also be used, further enhancing the location's accuracy. Similar positioning operations can be performed using proximity beacons, which might use short-range wireless signals such as BLUETOOTH® wireless signals, BLUETOOTH® low energy (BLE) wireless signals, IBEACON® wireless signals, personal area network (PAN) signals, microwave signals, radio wave signals, or other signals discussed above. Similar positioning operations can be performed using wired local area networks (LAN) or wireless local area networks (WLAN) where locations are known of one or more network devices in communication with the computing system 1100 such as a router, modem, switch, hub, bridge, gateway, or repeater. These may also include Global Navigation Satellite System (GNSS) receivers or transceivers that are used to determine a location of the computing system 1100 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. Input devices 1160 may include receivers or transceivers corresponding to one or more of these GNSS systems.

Display system 1170 may include a liquid crystal display (LCD), a plasma display, an organic light-emitting diode (OLED) display, an electronic ink or "e-paper" display, a projector-based display, a holographic display, or another suitable display device. Display system 1170 receives textual and graphical information, and processes the information for output to the display device. The display system 1170 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 1180 may include any type of computer support device to add additional functionality to the computer system. For example, peripheral device(s) 1180 may include one or more additional output devices of any of the types discussed with respect to output device 1150, one or more additional input devices of any of the types discussed with respect to input device 1160, one or more additional display systems of any of the types discussed with respect to display system 1170, one or more memories or mass storage devices or portable storage devices of any of the types discussed with respect to memory 1120 or mass storage 1130 or portable storage 1140, a modem, a router, an antenna, a wired or wireless transceiver, a printer, a bar code scanner, a quick-response ("QR") code scanner, a magnetic stripe card reader, a integrated circuit chip (ICC) card reader such as a smartcard reader or a EUROPAY®-MASTERCARD®-VISA® (EMV) chip card reader, a near field communication (NFC) reader, a document/image scanner, a visible light camera, a thermal/infrared camera, an ultraviolet-sensitive camera, a night vision camera, a light sensor, a phototransistor, a photoresistor, a thermometer, a thermistor, a battery, a power source, a proximity sensor, a laser rangefinder, a sonar transceiver, a radar transceiver, a lidar transceiver, a network device, a motor, an actuator, a pump, a conveyer belt, a robotic arm, a rotor, a drill, a chemical assay device, or some combination thereof.

The components contained in the computer system 1100 of FIG. 11 can include those typically found in computer systems that may be suitable for use with some aspects of the subject technology and represent a broad category of such computer components that are well known in the art. That said, the computer system 1100 of FIG. 11 can be customized and specialized for the purposes discussed herein and to carry out the various operations discussed herein, with specialized hardware components, specialized arrangements of hardware components, and/or specialized software. Thus, the computer system 1100 of FIG. 11 can be a personal computer, a hand held computing device, a telephone ("smartphone" or otherwise), a mobile computing device, a workstation, a server (on a server rack or otherwise), a minicomputer, a mainframe computer, a tablet computing device, a wearable device (such as a watch, a ring, a pair of glasses, or another type of jewelry or clothing or accessory), a video game console (portable or otherwise), an e-book reader, a media player device (portable or otherwise), a vehicle-based computer, another type of computing device, or some combination thereof. The computer system 1100 may in some cases be a virtual computer system executed by another computer system. The computer can also include different bus configurations, networked platforms, multi-processor platforms, etc. Various operating systems can be used including Unix®, Linux®, FreeBSD®, FreeNAS®, pf Sense®, Windows®, Apple® Macintosh OS® ("MacOS®"), Palm OS®, Google® Android®, Google® Chrome OS®, Chromium® OS®, OPENSTEP®, XNU®, Darwin®, Apple® iOS®, Apple® tvOS®, Apple® watchOS®, Apple® audioOS®, Amazon® Fire OS®, Amazon® Kindle OS®, variants of any of these, other suitable operating systems, or combinations thereof. The computer system 1100 may also use a Basic Input/Output System (BIOS) or Unified Extensible Firmware Interface (UEFI) as a layer upon which the operating system(s) are run.

In some cases, the computer system 1100 may be part of a multi-computer system that uses multiple computer systems 1100, each for one or more specific tasks or purposes. For example, the multi-computer system may include multiple computer systems 1100 communicatively coupled together via at least one of a personal area network (PAN), a local area network (LAN), a wireless local area network (WLAN), a municipal area network (MAN), a wide area network (WAN), or some combination thereof. The multi-computer system may further include multiple computer systems 1100 from different networks communicatively coupled together via the internet (also known as a "distributed" system).

Some aspects of the subject technology may be implemented in an application that may be operable using a variety of devices. Non-transitory computer-readable storage media refer to any medium or media that participate in providing instructions to a central processing unit (CPU) for execution and that may be used in the memory 1120, the mass storage 1130, the portable storage 1140, or some combination thereof. Such media can take many forms, including, but not limited to, non-volatile and volatile media such as optical or magnetic disks and dynamic memory, respectively. Some forms of non-transitory computer-readable media include, for example, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L11), resistive random-access memory (RRAM/ReRAM), phase change memory (PCM), spin transfer torque RAM (STT-RAM), another memory chip or cartridge, or a combination thereof.

Various forms of transmission media may be involved in carrying one or more sequences of one or more instructions to a processor 1110 for execution. A bus 1190 carries the data to system RAM or another memory 1120, from which a processor 1110 retrieves and executes the instructions. The instructions received by system RAM or another memory 1120 can optionally be stored on a fixed disk (mass storage device 1130/portable storage 1140) either before or after execution by processor 1110. Various forms of storage may likewise be implemented as well as the necessary network interfaces and network topologies to implement the same.

Figure 12:
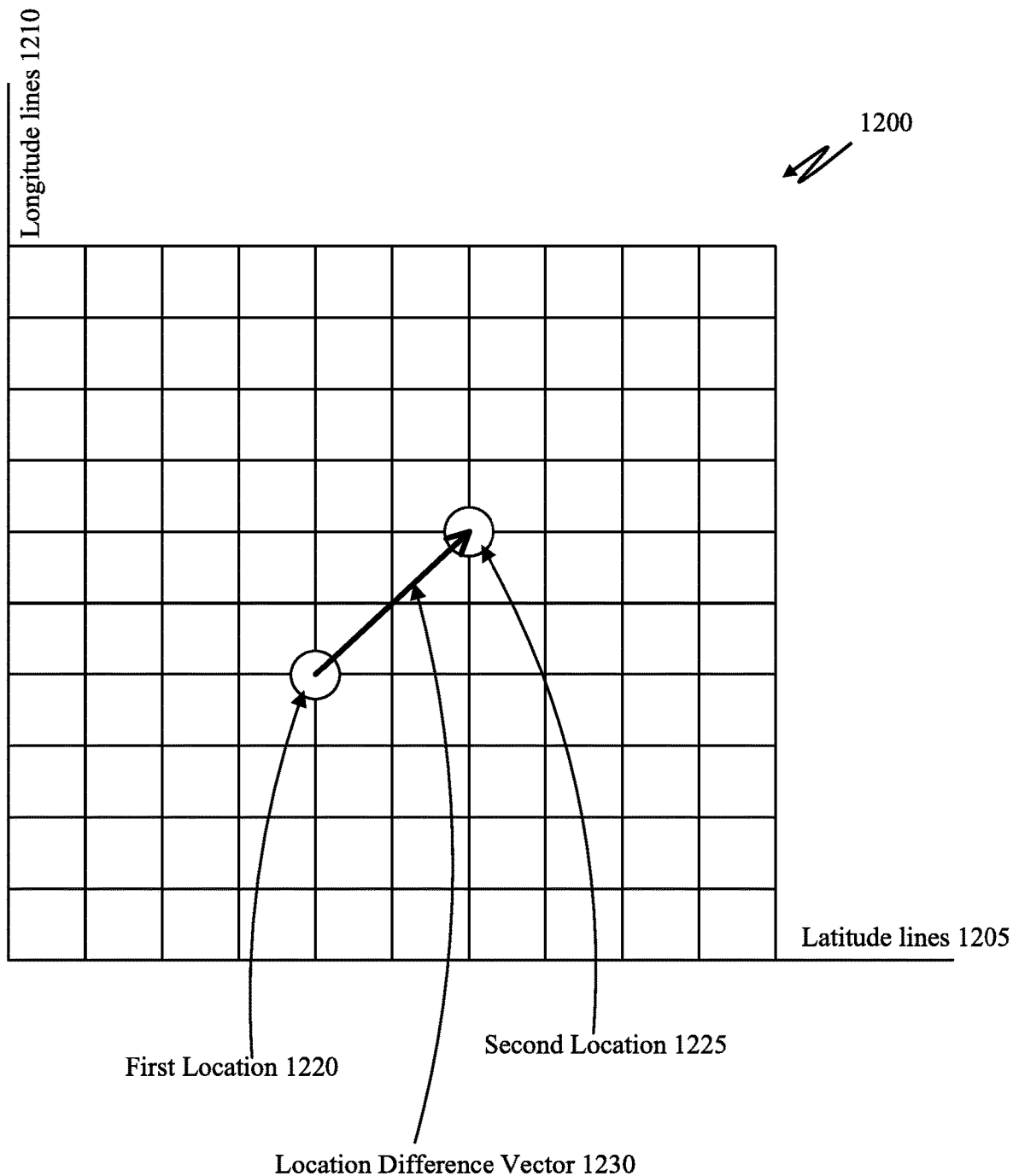
FIG. 12 illustrates a latitude and longitude positioning grid with a first location, a second location, and a location difference vector.

FIG. 12 is an illustration of a latitude and longitude positioning grid 1200 with a first location, a second location, and a location difference vector. The grid 1200 includes horizontal latitude lines 1205 and vertical longitude lines 1210. The distance between each horizontal latitude lines 1205 and between each vertical longitude lines 1210 may be any distance, and in this case may for example be a less than ten meters or less than one meter.

The grid 1200 identifies a first location 1220 identified according to step 1005 or step 1010 of FIG. 10, a second location 1225 northeast of the first location 1220 identified according to step 1015 or step 1020 of FIG. 10, and a location difference vector 1230 representing one possible type of location difference identified in step 1040 of FIG. 10 and/or one possible type of calibration information as identified in step 1045 of FIG. 10. Calibration of locations from the positioning receiver may involve offsetting locations according to the distance and direction of the location difference vector 1230, or of a new vector that is based on the location difference vector 1230, such as an average vector averaging several location difference vectors including the location difference vector 1230 of FIG. 12.

While various flow diagrams provided and described above (including at least FIG. 3, FIG. 4, FIG. 5A, FIG. 5B, FIG. 6, FIG. 7, FIG. 8, FIG. 9, and FIG. 10) may show a particular order of operations performed by some embodiments of the subject technology, it should be understood that such order is exemplary. Alternative embodiments may perform the operations in a different order, combine certain operations, overlap certain operations, or some combination thereof. It should be understood that unless disclosed otherwise, any process illustrated in any flow diagram herein or otherwise illustrated or described herein may be performed by a machine, mechanism, and/or computing system 1100 discussed herein, and may be performed automatically (e.g., in response to one or more triggers/conditions described herein), autonomously, semi-autonomously (e.g., based on received instructions), or a combination thereof. Furthermore, any action described herein as occurring in response to one or more particular triggers/conditions should be understood to optionally occur automatically response to the one or more particular triggers/conditions.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim. Embodiments of the present disclosure may be provided as a computer program product, which may include a computer-readable medium tangibly embodying thereon instructions, which may be used to program a computer (or other electronic devices) to perform a process. The computer-readable medium may include, but is not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions (e.g., computer programming code, such as software or firmware). Moreover, embodiments of the present disclosure may also be downloaded as one or more computer program products, wherein the program may be transferred from a remote computer to a requesting computer by way of data signals embodied in a carrier wave or other propagation medium via a communication link (e.g., a modem or network connection).

What is claimed is:

1. A method for improving accuracy of location data of a vehicle in communication with a traffic system, the method comprising:
   receiving a first location from a positioning receiver associated with the vehicle while the vehicle is in an area;
   receiving a second location wirelessly from a traffic infrastructure device that is located in the area, wherein the second location is derived from spatial data of the area captured by a sensor associated with the traffic infrastructure device and predetermined location data mapped with the spatial data;
   comparing the first location and the second location;
   identifying a location difference between the first location and the second location; and
   calibrating the positioning receiver based on the identified location difference.

2. The method of claim 1, wherein the first location includes predetermined location data based on a prior calculated global navigation satellite system (GNSS) location coordinate associated with the vehicle.

3. The method of claim 1, wherein the area is defined based on a wireless communication range of a short-range wireless transceiver used associated with the traffic infrastructure device.

4. The method of claim 1, wherein the location difference includes a distance between the first location and the second location, and wherein calibrating the positioning receiver based on the location difference includes offsetting subsequent locations received from the positioning receiver by an calibration distance that is based on the distance between the first location and the second location.

5. The method of claim 1, wherein the location difference is associated with a direction between the first location and the second location, and wherein calibrating the positioning receiver based on the location difference includes offsetting subsequent locations received from the positioning receiver in a calibration direction that is based on the direction between the first location and the second location.

6. The method of claim 1, wherein the location data are mapped with the spatial data by dividing the area captured by the sensor into a plurality of sub-areas and mapping the location data to the plurality of sub-areas, the method further comprising:
   determining a sub-area of the plurality of sub-areas that the vehicle is in; and
   extracting, from the predetermined location data, location data of the determined sub-area, wherein the second location corresponds to the extracted location data.

7. A system of improving positioning accuracy, the system comprising:
   a positioning receiver that identifies a first location based on receipt of one or more positioning signals;
   a wireless communication transceiver that receives a second location wirelessly from a second device, wherein at least one of the first location or the second location is derived from spatial data of an area captured by a sensor and predetermined location data mapped with the spatial data;
   a memory that stores instructions; and
   a processor that executes the instructions, wherein execution of the instructions by the processor:
      compares the first location and the second location,
      identifies a location difference between the first location and the second location, and
      calibrates the positioning receiver using the location difference.

8. The system of claim 7, wherein the second device is a traffic infrastructure device, and wherein the wireless communication transceiver and the positioning receiver are associated with a vehicle.

9. The system of claim 7, wherein the second device is a first vehicle, and wherein the wireless communication transceiver and the positioning receiver are associated with a second vehicle.

10. The system of claim 7, wherein the second device is a vehicle, and wherein the wireless communication transceiver and the positioning receiver are associated with a traffic infrastructure device.

11. The system of claim 7, wherein the location difference includes a distance between the first location and the second location, and wherein the processor calibrates the positioning receiver based on the location difference by offsetting subsequent locations received from the positioning receiver by an calibration distance that is based on the distance between the first location and the second location.

12. The system of claim 7, wherein the location difference is associated with a direction between the first location and the second location, and wherein the processor calibrates the positioning receiver based on the location difference by offsetting subsequent locations received from the positioning receiver in a calibration direction that is based on the direction between the first location and the second location.

13. The system of claim 7, wherein the processor executes further instructions to generate calibration information based on the location difference by converting a format of the location difference, and wherein the processor calibrates the positioning receiver based on the calibration information.

14. The system of claim 7, wherein the processor executes further instructions to generate calibration information based on the location difference by calculating an average vector from a vector of the location difference and one or more other calibration vectors, and wherein the processor calibrates the positioning receiver based on the calibration information.

15. A method of improving positioning accuracy, the method comprising:
   receiving a first location from a first device;
   receiving a second location wirelessly from a second device, the second location identified using a positioning receiver associated with the second device, wherein at least one of the first location or the second location is derived from spatial data of an area captured by a sensor and predetermined location data mapped with the spatial data;
   comparing the first location and the second location;
   identifying a location difference between the first location and the second location;
   generating calibration information based on the location difference; and transmitting the calibration information wirelessly to the second device, wherein the second device calibrates the positioning receiver using the calibration information.

16. The method of claim 15, wherein the first device is a traffic infrastructure device, and the second device is a vehicle.

17. The method of claim 15, wherein the first device is a vehicle, and the second device is a traffic infrastructure device.

18. The method of claim 15, wherein the location difference includes a vector having a distance and a direction between the first location and the second location, and wherein calibrating the positioning receiver is based on the vector.

19. The method of claim 15, wherein the first location is a location of the first device according to the first device, and wherein the second location is a location of the second device according to the second device.

20. The method of claim 15, wherein the second location is a location of the second device according to the second device, and wherein the first location is a location of the second device according to the first device.

\* \* \* \* \*